F. A. PRESKO.
RUNNING GEAR FOR VEHICLES.

No. 190,365. Patented May 1, 1877.

Witnesses
Otto Hupeland.
Robt E. Miller.

Inventor
Frederick A. Presko
by
Van Santvoord & Hauff
his attorneys.

UNITED STATES PATENT OFFICE.

FREDERICK A. PRESKO, OF NEW YORK, N. Y.

IMPROVEMENT IN RUNNING-GEAR FOR VEHICLES.

Specification forming part of Letters Patent No. 190,365, dated May 1, 1877; application filed March 22, 1877.

*To all whom it may concern:*

Be it known that I, FREDERICK A. PRESKO, of the city, county, and State of New York, have invented a new and useful Improvement in Wheel-Vehicles, which improvement is fully set forth in the following specification, reference being had to the accompanying drawing, in which—

Figure 1:
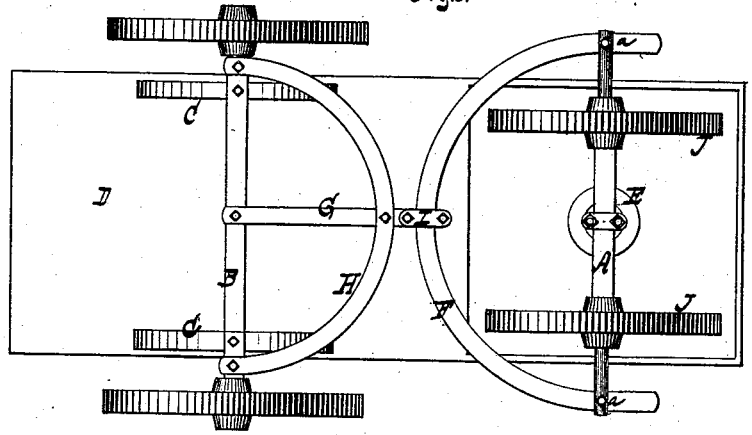
Figure 2:
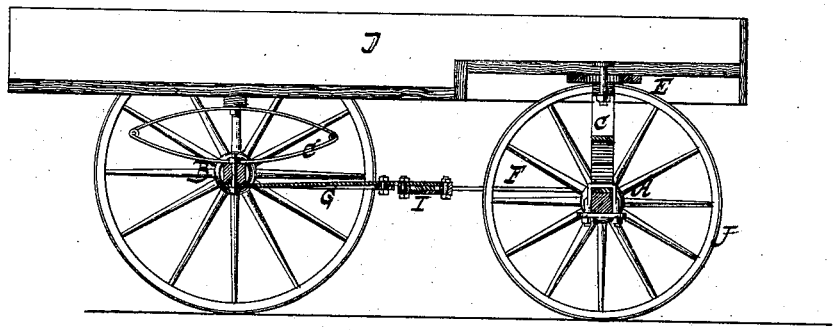

Figure 1 represents an inverted plan view of a vehicle containing my improvement. Fig. 2 is a longitudinal vertical section thereof.

Similar letters indicate corresponding parts.

My invention consists in a vehicle in which is combined two front wheels mounted on a common axle, a spring connecting the axle with the body of the vehicle, a segmental plate fastened to the outer ends of the axle, and a reach extending from the rear axle and provided with a guide-box for the segmental plate, all of which will be fully hereinafter set forth.

In the drawing, the letter A designates the forward or steering axle, and B is the hind axle, of a wheel-vehicle having the usual springs C for supporting the body D, the forward axle being also provided with the usual fifth or steering wheel E, which, in the example shown, is placed under the body D, and above the spring of the said axle.

To the outer portion of the forward axle A are secured the opposite ends of a bow, F, the means for securing the bow F consisting, in the present example, of a screw-bolt, *a*.

To the hind axle B is bolted or otherwise secured a bar, G, in such a manner that said bar projects from said hind axle in the line of draft of the vehicle. This bar forms a perch, and it is connected to the axle by a brace or braces, H, preferably made in the form of a bow. The perch-bar G is provided at its front end with an eye, I, which may be formed in any desirable way, and through this eye the bow F is made to pass, as shown, the bow being fitted in the eye. Thus, when the front axle A is turned, the bow F slides in the eye I, and said axle is steadied or guided in its movement. By the bow F and the perch-bar G the two axles A B are very firmly connected together, while said parts, moreover, permit of turning the axle A without danger of obstructing the forward wheels, as in the old class of perch vehicles.

The forward wheels J J are situated within the bow F, and are mounted on the axle A in any suitable manner, being placed at such a distance inward that they clear the front end of the perch-bar G when the forward axle is turned.

I am aware that it is not new to arrange a single wheel between a semicircular bar which passes through a guide in the front end of a rod projecting from the rear axle; but such is not my invention, and is, therefore, disclaimed. By my invention I employ two front wheels arranged between the ends of the semicircular plate, whereby I am enabled to arrange the usual spring between the front axle and body of the vehicle, which cannot be accomplished where a single front wheel is used.

What I claim as new, and desire to secure by Letters Patent, is—

The combination, in a vehicle, of two front wheels mounted on a common axle, A, a spring, C, connecting the axle with the body D, a segmental plate, F, which is detachably fastened to the outer ends of the axle A, and a reach, G, extending from the rear axle, and provided with a guide-box, I, for the segmental plate F, as and for the purpose described.

In testimony that I claim the foregoing I have hereunto set my hand and seal this 19th day of March, 1877.

FREDERICK A. PRESKO. [L. S.]

Witnesses:
W. HAUFF,
E. F. KASTENHUBER.